Jan. 1, 1929.

H. SCHNEIDER 1,697,253

TRANSMISSION GEAR

Filed Nov. 27, 1922     5 Sheets-Sheet 1

Inventor:
Heinrich Schneider,
By Henry Orth Jr
Atty.

Jan. 1, 1929.

H. SCHNEIDER 1,697,253

TRANSMISSION GEAR

Filed Nov. 27, 1922     5 Sheets-Sheet 3

Inventor:
Heinrich Schneider
By Henry Orth
Atty.

Jan. 1, 1929.

H. SCHNEIDER 1,697,253

TRANSMISSION GEAR

Filed Nov. 27, 1922

Inventor:
Heinrich Schneider
By Henry Orth Jr.
Atty.

Fi G. 9
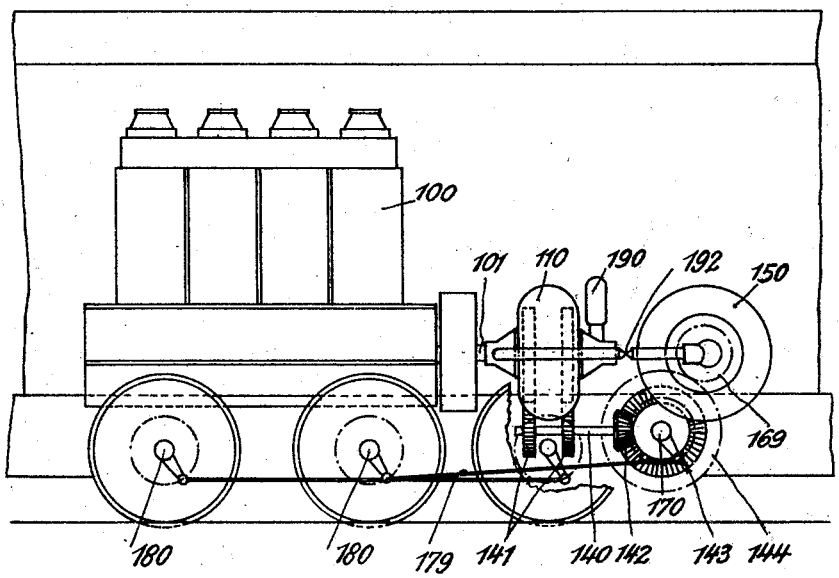
Fi G. 10
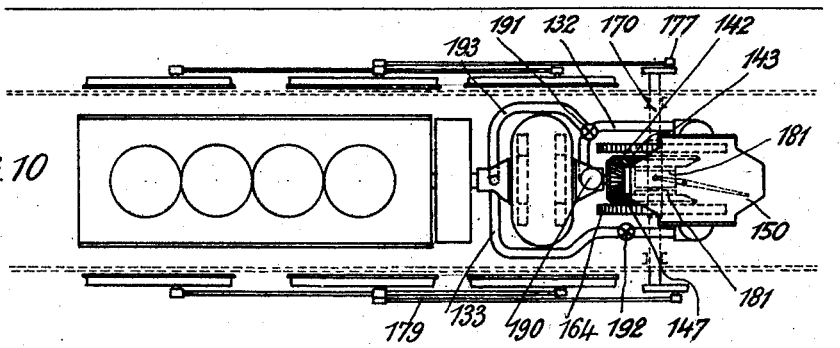
Inventor:
Heinrich Schneider

Patented Jan. 1, 1929.

1,697,253

UNITED STATES PATENT OFFICE.

HEINRICH SCHNEIDER, OF ILLNAU, SWITZERLAND.

TRANSMISSION GEAR.

Application filed November 27, 1922, Serial No. 603,670, and in Germany December 6, 1921.

The present invention relates to improvements in transmission mechanism. It comprises at least two hydraulic mechanism parts, a primary liquid operated mechanism, hereinafter called a "pump" and a secondary liquid operated mechanism, called a "motor" It should be understood that the pump may act as a motor also, and the motor as a pump, as set forth in the description.

The present invention shows in combination new constructions, which result in improvement of efficiency of such transmissions and give constructions capable of transmitting high horse-power with a simple control of transmssion ratio and speed of the driven shaft, especially applicable to motor driven vehicles and locomotives.

To set forth the features of the invention described herein, two constructional examples of such fluid operated transmission mechanism are illustrated on the accompanying drawings, in which:—

Figure 5:
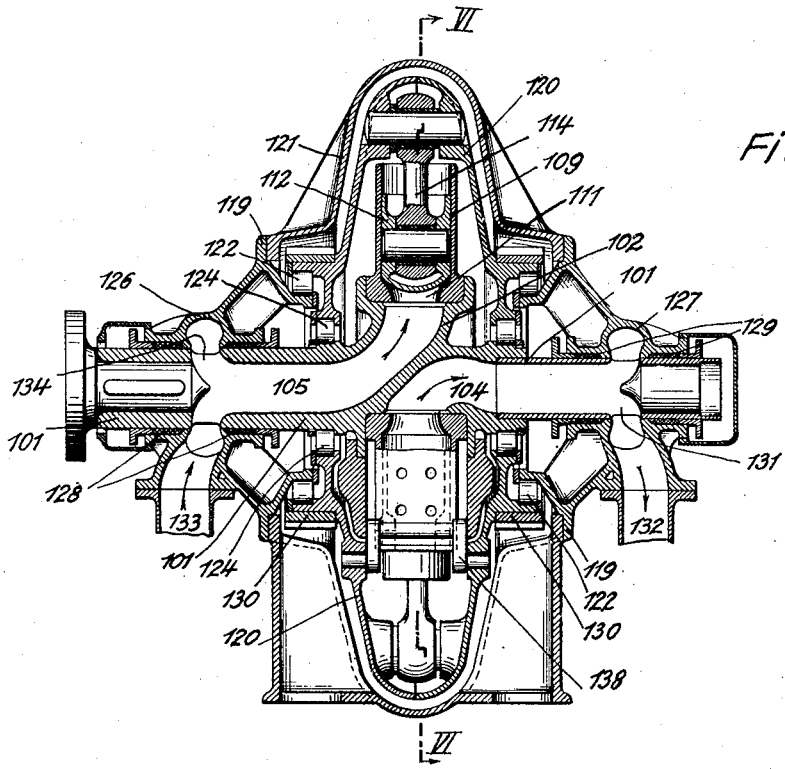
Figure 6:
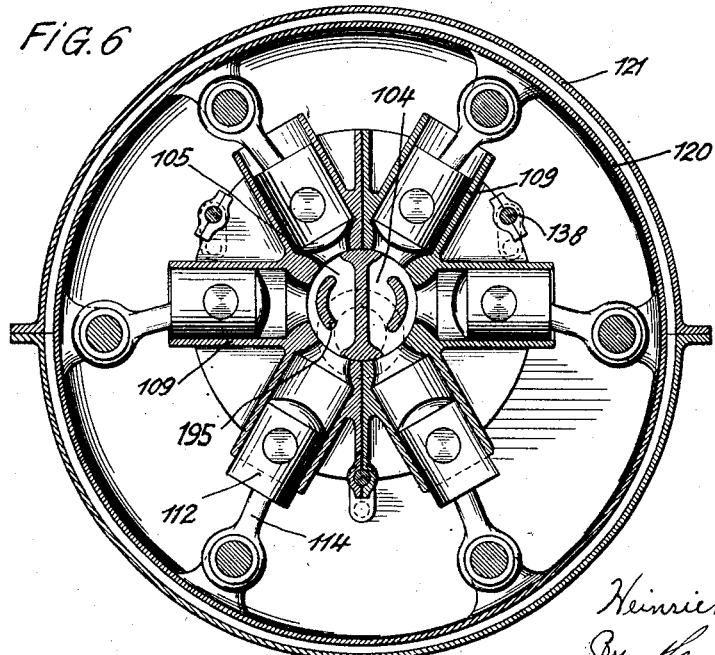
Figure 7:
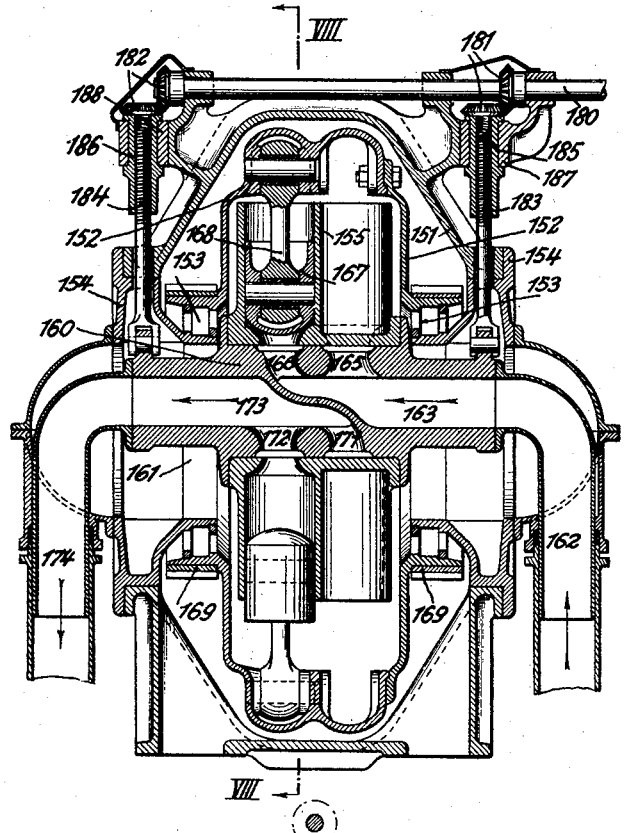
Figure 8:
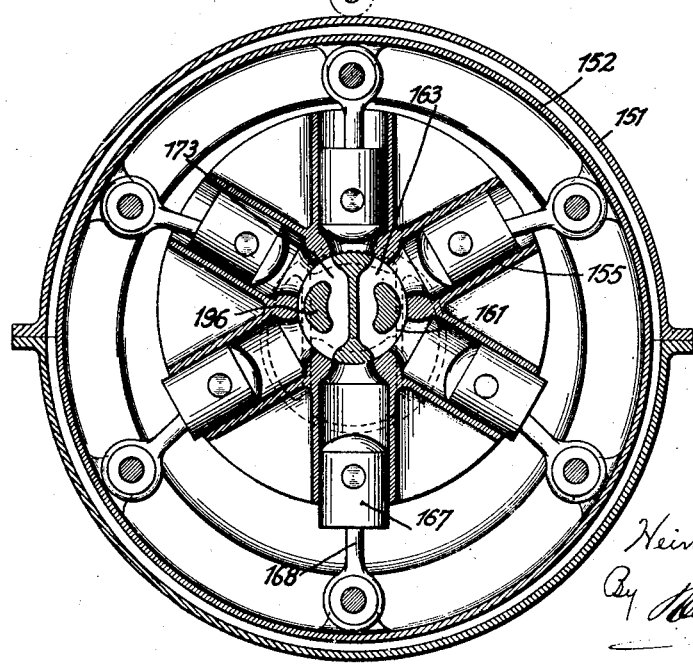

Figs. 5 and 6 show in a longitudinal section and in a cross-section along line VI—VI of Fig. 5 respectively the pump of a second constructional example, Figs. 7 and 8 show in a longitudinal section and in a cross-section along line VIII—VIII of Fig. 7 respectively the motor cooperating with the pump illustrated in Figs. 5 and 6, and Figs. 9 and 10 show in elevation and in plan respectively the connections between the pump and motor and their arrangement on an oil-motor driven locomotive.

In the first constructional example illustrated in Figs. 1-4 the transmission mechanism comprises a pump and a two-stage motor; the mechanical coupling between rotating parts of pump and motor is effected by the rotor which is common to both.

The motor consists of a two-stage rotary motor the cylinders of which are arranged in a spider and forming a rotor which is rigidly connected to the rotor comprising the cylinders of the pump, the stroke of the pistons of which motor can be altered by a displacement of crank pins. The liquid displaced by the pistons of the pump A can act upon the pistons of the two stages $B^1$, $B^2$ of the motor and thereby on the same rotor and transmits a part of the turning moment delivered to the mechanism by the driving shaft.

By displacing the crank pins of the motor to a smaller or greater extent relatively to the axis of the cylinder rotors any speed ratio between the driving and the driven shaft can be obtained within the limits determined by the stroke volumes of the pump and the motor.

Referring now to Figs. 1–4 of the drawings, 1 denotes the transmission casing provided with bearings 7, 8 and 9 in which the rotor 2 comprising the cylinders 3, of the pump A and the cylinders 13 and 23 of the two stages $B^1$, $B^2$ of the motor is rotatably mounted. By means of the cover 17 a guide box 18 is provided in the casing 1, in which guide box the nonrotatable crank pin 10 for the stages $B^1$ and $B^2$ of the motor is mounted by means of the guide piece 20 of rectangular cross-section which is integral with the crank pin. The guide piece 20 can be displaced in a radial direction by turning the screw spindle 19 in one or the other direction.

The driving crank shaft 11 is rotatably mounted in the rotor 2 by the bearings 21 and 22. Each motor or motor-stage respectively consists of six cylinders arranged to form a spider and provided with pistons 4, 14 and 24, hollow connecting rods 5, 15 and 25 and crank pin bushes 6, 16 and 26. The number of cylinders is chosen from the point of view of providing a stroke-volume that is as large as possible. From each of the cylinders 3 of the pump A channels 30 lead to a disc 31 which is rigidly connected to the driving crank shaft 11. The disc 31 (Figs. 1 and 4) is provided with a pressure channel 32 and a suction channel 34, the channels being so arranged, that during the rotation of the disc 31 the cylinders 3 in which compression takes place, are during that period connected with the channel 33 centrally arranged in the disc 37, the latter being fixed to the rotor by means of screws 38, and the remaining cylinders are in connection with the interior 40 of the rotor through the suction channel 34. The disc 31 controls, therefore, the flow of the liquid to and from the cylinders.

The crank pin 10 is provided with a pressure channel 44, 45 through which the driving liquid leaving the channel 33 flows along the hollow connecting rods 15, 25, and pistons 14, 24 respectively into the cylinders 13, 23 of the motor. The driving liquid after having performed useful work in said cylinders can escape through the hollow connecting rods and the channels 48, 49 provided in the crank pin 10 into the interior 39 of the mechanism.

Figure 1:
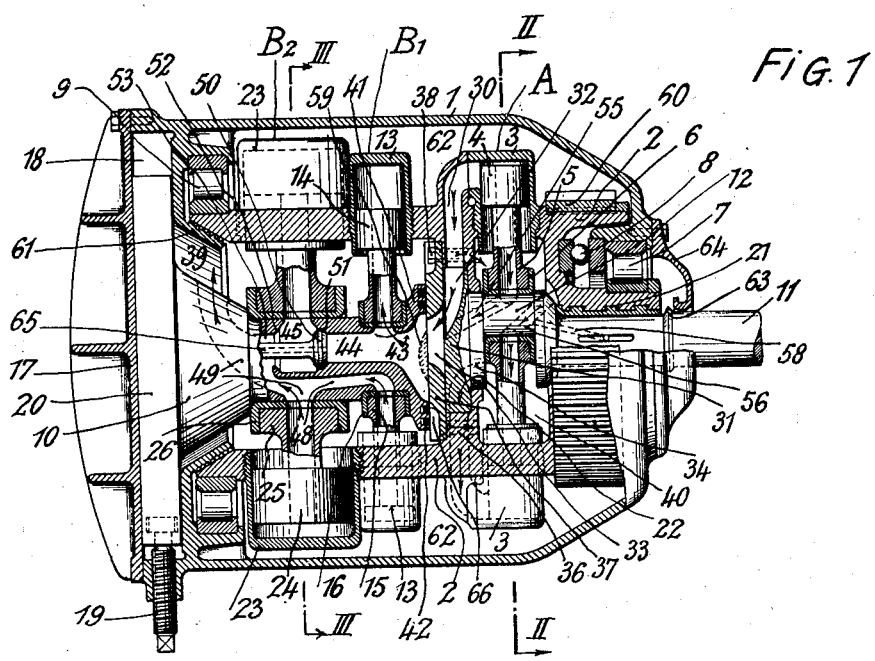
Fig. 1 is a longitudinal section through a liquid operated transmission mechanism in which pump and motor are arranged in a casing common to both.
Figure 2:
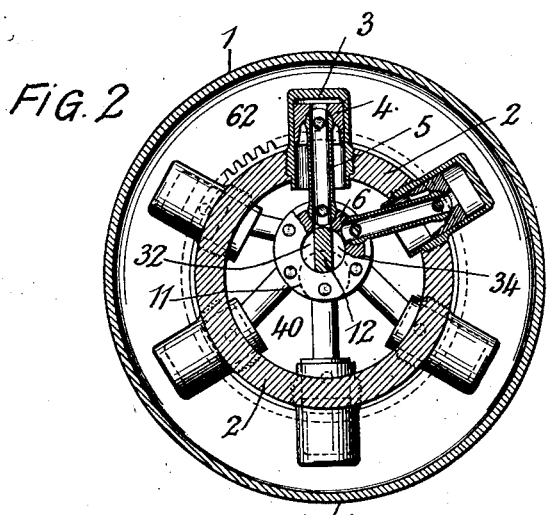
Fig. 2 is a cross-section through the pump along line II—II of Fig. 1.
Figure 3:
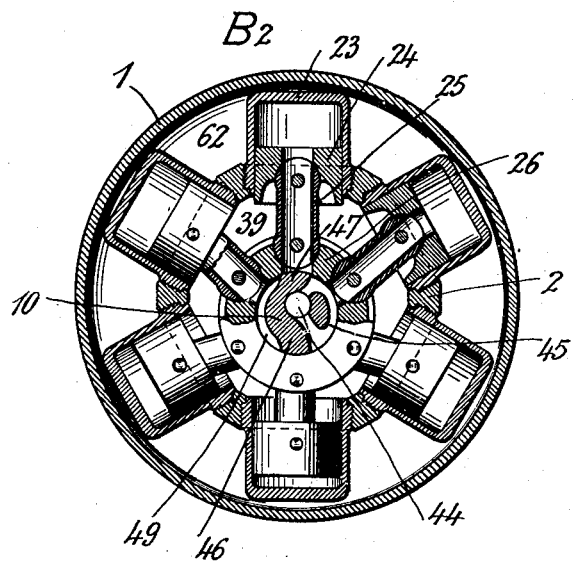
Fig. 3 is a cross-section through the motor along line III—III of Fig. 1.
Figure 4:
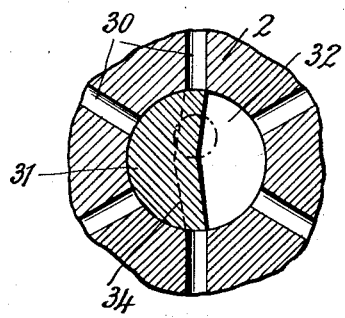
Fig. 4 is a section through a detail.

In Fig. 3 of the drawings the channels 44, 45 and 49 and the bearing bush 26 which controls the flow through said channels are shown. Channel 45 is so designed that it is in connection with the cylinders 23 which have to perform work, whereas channel 49 is in connection with the cylinders 23 which have to be emptied. The two channels 45 and 49 are separated from each other by the division wall 46, 47.

When the valve 50 is pressed against the seat 51 the stage $B^2$ of the motor can be cut off from connection with the pump A, in which case only the stage $B^1$ is operative and the stage $B^2$ is running idle, whereby through the channel 53 past the back seat of the valve a flow of the liquid may occur for the purpose of equalizing pressures in the cylinders of stage $B^2$. When the valve 50 is pressed on the back seat 52 both stages of the motor are operative, whilst with the valve 50 in the mid-position the motor runs idle.

The pressure channel 44 in the crank pin 10 is provided with an enlarged portion 43 directed towards the channel 33 and the outer wall of the enlarged portion 43 ends in a flange 41 which bears against the rotating disc 37 by means of packing rings 42.

The interior of the rotor 2 containing the cylinders is filled with oil so that all the working parts of the mechanism run in an oil bath. Bores 36 passing through the disc 37 and the rotor 2 serve to connect the inner spaces 39 and 40 of the pump and the motor, so that oil escaping through channel 49 into the space 39 can flow back into the space 40 through the bores 36, from which space it can be sucked through channel 34 of the disc 31 and channels 30 of the pistons 4 of the pump A.

In order to provide for larger passage areas for the liquid to flow through, the pistons 4 as well as the connecting rods 5 are made hollow and channels 55 and 56 respectively are provided in the crank pin 12 so that pressure oil can also flow through the channel 55 to the channel 33 and oil can be sucked in through the channel 56. In this manner a good lubrication of the crank pin 12 is ensured. From the channel 56 pressure oil may flow to the loaded side of the bearing 21 through the bore 58.

A wall part 59 is indicated in dotted lines in the pressure channel 44, 43 and by means of the part 59 the channel 33 can be completely separated from the channel 44 when the crank-pin 10 is in its mid-position.

The cylinder rotor 2 is provided with a toothed rim 60 by means of which the power is transmitted to the driven shaft not indicated in Figs. 1–4.

A packing 61 prevents leakage of oil from the inner space 39 of the rotor to the outer space 62 in the casing, while the oil leaking from the bearing 21 enters the space 62 through the bearings 7 and 8. A splash ring 63 is provided on the shaft 11 and the cover 64 prevents an escape of the oil towards the outside.

The spindle of the valve 50 is provided with a bore 65 through which the pressure in the cylinders or the turning moment may be measured.

The above described transmission or change speed gear operates as follows:

Let it be assumed that the described transmission mechanism is utilized in a motor-car instead of the usual change speed gear. My transmission mechanism renders at the same time the clutch and the brake superfluous. When starting the motor the crank pin 10 is brought into its running light position i. e. into the position of its greatest eccentricity, in which the channel 43 is connected to the interior 39, 40 of the casing through the annular groove 66 in the disc 37. When the motor is started the pistons of the pump A cause a flow of the liquid through the channels 30, 32, 44, 45, 53 (when the valve 50 is in its mid-position) into the space 39 and the rotor 2 remains stationary. The crank pin 10 can be displaced so far in the radial direction that even when the valve 50 is pressed against its back seat 52 a turning motion of the rotor 2 does not occur owing to the escape of the liquid through the groove 66. If now the crank pin 10 is by degrees moved towards the centre of the rotor 2, the groove 66 is covered gradually and liquid pressure is generated in the cylinders and the rotor 2 starts to turn and the motor-car starts to move. The further the crank pin 10 is moved towards the center the quicker the automobile runs. In the mid-position of the crank-pin channel 33 is closed by the part 59 and the motor rendered inoperative by closing the valve 50, the rotor 2 is then directly coupled with the driving crank shaft.

When it is desired to increase the ratio or the secondary turning moment, for instance when the vehicle runs up an incline, crank pin 10 is displaced in the radial outward direction and the connection between pump and motor is established. The required speed ratio $n_1 : n_2$ may be assumed to be 2:1. During two revolutions of the driving crank shaft or one revolution of the rotor respectively the pump A delivers the contents of all of its six cylinders into the motor. As the number and sizes of the cylinders of stage $B^1$ of the motor are the same as in the pump A the crank pin 10 will have to be adjusted to give the same piston stroke as the driving crank shaft imparts to the pistons of the pump and the stage B² of the motor is rendered inoperative by closing the valve 50.

When a speed ratio of for example 5:1 has to be produced the valve 50 is pressed on the back seat 52 and pin 10 is so adjusted that the motor receives quantity of oil corresponding to 4 times the total contents of the cylinders of pump A during five primary revolutions. The variation of the speed, the running idle and the direct coupling as well as a braking effect (in connection with the cutting off of the fuel of the driving motor) can be effected by the continuous adjusting movement of the pin 10.

With the above described constructional example having two secondary stages only stage B¹ is operative for obtaining speed ratios between 1:1 and 2:1, the valve 50 being pressed against the seat 51 and stage B² runs idle; for obtaining speed ratios between 2:1 and 5:1 and more both stages B¹ and B² are operative, the valve 50 being pressed on its back seat 52.

When the crank pin 10 is displaced out of the axis of the rotor in the opposite direction to that described above the motor work hydraulically on the pump and the speed of the driven shaft is increased above the speed of the driving shaft.

With the transmission mechanism having two stages in the motor the member 59 in the channel 44 may be dispensed with, as with direct coupling stage B² is cut off by means of the valve 50 and the stage B¹ causes but little friction losses when running idle. In case a motor with only one stage is provided the member 59 or a valve in the channel 44 are required. A motor having two stages is more advantageous than a motor having only one stage as in the former case stage B¹ can work with a large stroke and at a high efficiency also with the smaller speed ratios.

For the drive of vehicles such as automobiles and oil-engine driven locomotives a motor having only one stage is generally sufficient, whilst for the drive of lifting mechanisms and machines necessitating large variations in the speed ratio a motor having two stages will be useful.

When the output and the speed of the engine is altered the vehicle which is provided with the transmission mechanism according to the present invention may travel most of the time with the mechanism directly coupled and only when the vehicle travels up steep gradients a change of the speed ratio has to be effected by displacing the crank pin. The combination of the transmission mechanism with a motor that will stand an overload ensures a very flexible drive and the simplest operation.

In the second constructional example illustrated in Figs. 5–10 the pump and the motor are built separately, their rotors are mechanically coupled with each other and with the driven shaft as will be described hereinafter.

An oil-engine 100 (Figs. 9 and 10) imparts its output to the shaft 101 of the pump 110 (Figs. 5, 9 and 10). The shaft 101 is built as a hollow shaft provided with a crank 102; channels 104 and 105 are provided in the crank part and connected to parts of the hollow shaft 101, in which channels the motive liquid under pressure and at suction-pressure respectively circulates. On the crank pin 102 the cylinder block 109 consisting of six cylinders is rotatably mounted, the cylinders are arranged to form a spider and are provided with ports 111 communicating with the channels 104 and 105 in the crank part when the cylinder block rotates. The pistons 112 act by means of connecting rods 114 on the primary rotor 120 which is rotatably mounted in the casing 121 by means of two roller bearings 122. The primary rotor 120 provides further for the mounting of the crank shaft 101 by means of the roller bearings 124 interposed between the two.

The flow of the fluid to and from the cylinders is controlled directly by the ports in the hollow shafts. The area of the openings on the circumference of the crank pin 102 is made so large that the liquid pressure acting through the crank pin openings upon the cylinder block compensates the greatest part of the reactive forces under the piston upon the cylinder block, so that the friction between pin and cylinder block is reduced to a minimum.

The end covers 119 are provided with annular parts 126 and 127 having stuffing boxes 128 and 129. The motive liquid can be pumped to the motor through channel 104, opening 131 in the hollow shaft, annular part 127 and pipe 132 and the liquid can return from the motor through pipe 133, annular part 126, opening 134 and channel 105 into the cylinders 109.

The pump 120 is provided with two toothed rims 130 by means of which the output is transmitted to a countershaft 140 (Fig. 9) by gear wheels 141. A positive connection between rotor 120 and cylinder block 109 is effected by the auxiliary cranks 138.

The motor 150 (Figs. 9–10) comprises a casing 151 (Fig. 7), a secondary rotor 152 which is rotatably mounted by means of the roller bearings 153 in the covers 154 of the casing; a cylinder block 155 consisting of twelve cylinders arranged in two spiders one beside the other with an angle of 30° between the cylinder axes, the bore and the maximum stroke of the cylinders being the same as the bore and stroke of the cylinders 109 of the pump, and a crank pin 160 which is displaceably carried in guides 161 of the covers 154. The driving liquid can be pumped from the pump through pipe 162, the channel 163 provided in the crank pin 160 and the two apertures 165 and 166 to the cylinders 155, in which it acts on the pistons 167, which in their turn act by means of the connecting rods 168 on the rotor 152. The latter is provided with two toothed rims 169 meshing with gear wheels 144 rigidly connected to a lay-shaft 170 (Figs. 9 and 10) of the oil-motor driven locomotive. The motive liquid leaves the cylinders through the apertures 171, 172, channel 173 provided in the crank pin 160 and pipe 174 and is returned to the suction side of the pump. The crank pin 160 can be displaced in a radial direction by means of shaft 180, two pairs of bevel wheels 181 and 182, and rods 183 and 184, the latter being provided with screw threads engaging with internally threaded bushes 185 and 186 mounted in brackets 187 and 188 of the casing 151. By this displacement of the crank pin 160 the stroke of the cylinders can be altered.

The interior of the hollow crank pin has two separate chambers extending from the middle portion of the shaft toward each end, so that liquid enters each engine at one end of the crank pin and is discharged at the other end thereof. The hollow crank pins of both pump and motor have in the middle portion on each side of the centre wall, which separates the suction and pressure chambers, a rib (Figs. 6 and 8) 195 and 196 of reniform section to strengthen the shaft and to give uniform flow channels to the fluid, so that the fluid may flow around these ribs. The channel sections are larger at the inside of these ribs than at the outside of them. The exterior channels are narrower at their central portions.

The countershaft 140 (Figs. 9-10) transmits the power of the pump 110 by means of the bevel wheels 142, 143 to the lay shaft 170 and the power delivered by the motor is transmitted to the lay-shaft 170 by means of the pairs of gear wheels 169 and 144. The various gear wheels and the countershaft are the means by which the rotors of the pump and motor are mechanically coupled to each other and to the driven shaft.

The shafts of the oil-engine 100 and the pump 110 are arranged in the longitudinal direction of the locomotive, the axis of the motor 150 is arranged transverse to the locomotive. From the lay-shaft 170 the power is transmitted by cranks 177 and connecting rod 179 to the driving axles 180 of the locomotive.

In order to provide for the astern running of the locomotive the oil-engine can be arranged reversible or the bevel wheels 142 and 147 can be connected to the lay shaft 170 by means of disengageable clutches 181, diagrammatically indicated in Fig. 10.

The pressure pipe 132 is provided with an air vessel 190 and valves 191 and 192 are inserted in the pressure pipe and in the suction pipe respectively for the purpose of cutting out the motor and for arranging for the idle running of the transmission mechanism, in which case the pump causes a liquid circulatin from the pressure pipe 132 through the no-load pipe 193 to the suction pipe 133.

The above described transmission mechanism renders it possible to establish the following working conditions:

A running idle of the driving shaft by connecting the pressure pipe of the pump to the suction pipe.

A direct transmission of the oil-engine output via the pump and the gear wheels to the lay shaft 170 whereby the pump acts as coupling, the motor being cut out.

A continuous decrease of the speed of the lay-shaft by cutting in the motor, displacing the crank-pin of the latter in one direction out of the axis of the rotor and adjusting thereby the piston stroke to correspond to the desired speed ratio, whereby part of the output of the oil-engine is directly transmitted to the lay shaft by the rotor of the pump and the remainder of the output is transmitted by the rotor of the motor.

A continuous increase of the speed of the lay-shaft above the speed obtained by direct coupling, by displacing the crank pin of the motor in the opposite direction to that mentioned above, whereby the motor acts as pump and the pump acts as motor, and the former works hydraulically on the latter.

The present transmission mechanism has the following advantages:

A continuous variation of the speed ratio which avoids stepped ratios. Transmission of part of the output by direct coupling. Utilization of piston pumps having small friction and leakage losses and which are very suitable to work as pumps and as motors under high pressures.

Liberty to choose the speed for direct coupling when the vehicle travels at its normal speed. During normal speed the efficiency of the transmission gear is therefore at its highest figure.

The smaller the desired speed ratio is the higher is the portion of the output which is transmitted by direct coupling and the smaller is the portion of the output which is transmitted hydraulically, so that the total efficiency remains high.

I claim:

1. A liquid operated transmission mechanism, comprising in combination, a pump having cylinders arranged as a spider, a hollow driving crank shaft having a crank pin on which said cylinder spider is rotatably mounted, and ports in said shaft to control the flow of the fluid to and from said cylinders, a hydraulic motor, rotors for said pump and motor, toothed rims on said rotors, gear means interposed between said toothed rims to mechanically couple said rotors, and means for hydraulically interconnecting said pump and motor.

2. A liquid operated transmission mechanism comprising in combination, a hollow driving crank shaft, a pump having cylinders arranged as a spider rotatably mounted on the crank of the driving shaft, a non-rotating hollow shaft, a motor having cylinders arranged as a spider rotatably mounted on said non-rotating hollow shaft rotors for said pump and motor, both said hollow shafts having ports arranged to control the flow of fluid to and from said cylinders, means for hydraulically interconnecting said ports, and means interposed between said rotors of the pump and of the motor to mechanically couple them.

3. A liquid operated transmission mechanism comprising in combination, a hollow driving crank shaft, a pump having cylinders arranged as a spider rotatably mounted on the crank of the driving shaft, pistons cooperating with said cylinders, a non-rotating hollow shaft, a motor having cylinders arranged as a spider rotatably mounted on said non-rotating hollow shaft, pistons cooperating with said motor cylinders, rotors for said pump and motor, both said hollow shafts having ports arranged to control the flow of the fluid to and from said cylinders, means for hydraulically interconnecting said ports, means to effect a parallel displacement of the hollow shaft of the motor for altering the active stroke of its piston, and gear means interposed between said rotors of the pump and of the motor to mechanically connect said rotating parts.

4. A liquid operated transmission mechanism, comprising in combination, a pump of the rotating cylinder type having a rotor, a motor of the rotating cylinder type having a rotor, the cylinders of the pump and the motor being arranged to form spiders, members movable relatively to said cylinders and forming with the latter working chambers for the fluid, said members being operatively connected to said rotors, hollow shafts around which said spiders rotate and provided with ports to control the flow of the fluid to and from said cylinders, the hollow shaft of the pump being a crank shaft, means for altering the active stroke of the members cooperating with the motor cylinders, means for hydraulically interconnecting said hollow shafts, and means interposed between said rotating parts of the pump and of the motor to mechanically connect said rotors.

5. A liquid operated transmission mechanism, comprising in combination, a pump of the rotating cylinder type, a rotor for said pump, a motor of the rotating cylinder type, a rotor for said motor, the cylinders of pump and motor arranged to form spiders, and the axes of the cylinders extending in substantially radial directions, said rotors surrounding said cylinder spiders, pistons in said cylinders, and piston rods operatively connected to the rotors, hollow shafts around which said spiders rotate and provided with ports arranged to control the flow of the fluid to and from said cylinders, the hollow shaft of the pump being a crank shaft, means on the motor for altering the stroke of the motor pistons, means for hydraulically interconnecting said hollow shafts, and means interposed between the rotors of the pump and of the motor to mechanically couple said rotors together.

6. A liquid operated transmission mechanism, comprising in combination, a casing, a hollow driving crank shaft, a pump having cylinders arranged as a spider rotatably mounted on the crank of the shaft, pistons cooperating with said cylinders, a rotor surrounding said spider, piston rods interposed between said pistons and said rotor, said driving crank shaft being rotatably mounted in said rotor and the latter being rotatably mounted in the casing enclosing the pump, a motor having cylinders arranged in spider fashion rotatably mounted on a non-rotating hollow shaft, the latter and the hollow driving crank shaft having ports arranged to control the flow of the fluid to and from said cylinders, pistons co-operating with said cylinders, a rotor operatively connected to said motor pistons, means for altering the stroke of the pistons of the motor, means for hydraulically interconnecting said ports, and means interposed between rotating parts of the pump and of the motor to mechanically couple said rotors.

7. A liquid operated transmission mechanism, comprising in combination, a hollow driving crank shaft, a pump having cylinders arranged as a spider rotatably mounted on the crank of the driving crank shaft, pistons cooperating with said cylinders, a casing, a rotor therein surrounding said spider, piston rods interposed between said pistons and said rotor, said driving crank shaft being rotatably mounted in said rotor and the latter being rotatably mounted in the casing enclosing the pump, a toothed rim on said rotor, a non-rotating hollow shaft, a motor having cylinders arranged as a spider rotatably mounted on said non-rotating hollow shaft, the latter and the hollow driving crank shaft having ports arranged to control the flow of the fluid to and from the cylinders, pistons cooperating with the cylinders of said motor, a rotor on said motor operatively connected to the motor pistons, a toothed rim on the rotor of the motor, means for altering the active stroke of its pistons, means for hydraulically interconnecting said ports, a driven shaft, and a positive connection between said toothed rims and the driven shaft.

8. A liquid operated transmission mechanism, comprising in combination, a pump having cylinders arranged as a spider, a hollow driving crank shaft having ports arranged to control the flow of the fluid to and from said cylinders, said cylinder spider rotatably mounted on the crank shaft, a rotor, members cooperating with said cylinders to form working chambers for the fluid, said members being operatively connected to said rotor, a toothed rim on said rotor, a motor, a rotor therein, gear means interposed between said toothed rim of the pump and rotor of the motor, and means for hydraulically interconnecting said pump and motor.

9. A liquid operated transmission mechanism comprising in combination, a pump having cylinders arranged as a spider rotatably mounted on a hollow shaft, pistons in said cylinders, a motor having cylinders arranged as a spider rotatably mounted on a hollow shaft, pistons in said cylinders, the axes of the cylinders extending in radial direction, both hollow shafts having ports arranged to directly control the flow of the fluid to and from the cylinders, means for hydraulically interconnecting said pump and motor, rotors in pump and motor driven by their respective pistons, and toothed gear means interposed between the rotors of the pump and the motor, to mechanically couple them.

10. A liquid operated transmission mechanism comprising in combination, a pump of the rotating cylinder type, a motor of the rotating cylinder type, the cylinders of pump and motor being arranged to form spiders and the axes of the cylinders extending in radial directions, rotors surrounding said cylinder spiders, pistons in said cylinders, and piston rods interposed between said pistons and said rotors surrounding said spiders, a hollow shaft for the pump and a hollow shaft for the motor around which said spiders rotate and having ports controlled by the spiders to directly control the flow of the fluid to and from said cylinders, means to cause a parallel displacement of the motor shaft for altering the effective stroke of the motor pistons, means for hydraulically interconnecting said hollow pump and motor shafts, means interposed between rotating parts of the pump and of the motor to mechanically couple said rotors together, and means interposed between the cylinder spiders and the rotors for positively connecting them together.

11. A liquid operated transmission mechanism interposed between the shaft of a prime mover and a driven shaft, comprising in combination, a pump having a rotor, the axis of which is arranged in a line with the axis of the shaft of the prime mover and operatively connected to the latter, a hydraulic motor having a rotor, the axis of which is arranged at right angles to the axis of the shaft of the prime mover, toothed rims on the rotors of said pump and motor, means to hydraulically connect said pump to said motor, and gear means interposed between the toothed rims of said pump and motor and said driven shaft.

12. A liquid operated transmission mechanism interposed between the shaft of a prime mover and a driven shaft, comprising in combination, a pump the axis of which is arranged in line with the axis of the shaft of the prime mover and operatively connected to the latter, a hollow crank shaft having ports, said pump having cylinders arranged as a spider rotatably mounted on said crank shaft and controlling said ports, a hydraulic motor, the axis of which is arranged at right angles to the axis of the shaft of the prime mover, rotors on the pump and motor, the pump rotor being operatively connected to said cylinders, toothed rims on said rotors, means to hydraulically connect said pump and motor, and gear means mechanically connecting said toothed rims of the pump and motor and said driven shaft.

13. A liquid operated transmission mechanism interposed between the shaft of a prime mover and a driven shaft, comprising in combination, a pump, the axis of which is arranged in line with the axis of the shaft of the prime mover and operatively connected to the latter, a hydraulic motor, the axis of which is arranged at right angles to the axis of the shaft of the prime mover, cylinders for the pump and motor arranged as spiders, hollow shafts on which the spiders are mounted having ports controlled by the spiders, rotors for the pump and motor operatively connected to said cylinders, toothed rims on said rotors, means to hydraulically connect said pump and motor, and gear means interposed between the toothed rims of said pump and motor and said driven shaft.

14. A liquid operated transmission mechanism interposed between the shaft of a prime mover and a driven shaft, comprising in combination, a pump the axis of which is arranged in line with the axis of the prime mover, coupled to the latter, a hollow, ported crank shaft for the pump, a plurality of cylinders arranged as a spider and rotatably mounted on a hollow crank of the pump shaft, having ports arranged to cooperate with the shaft ports to control the fluid flow to and from said cylinders, pistons cooperating with said cylinders, a rotor operatively connected to said pistons, a toothed rim on said rotor, a hydraulic motor the axis of which is arranged at right angles to the axis of the prime mover, a non-rotating, hollow ported shaft for the motor, a plurality of cylinders rotatably mounted on the non-rotating hollow shaft, said motor cylinders having ports controlling the ports of the non-rotating hollow shaft, pistons cooperating with said motor cylinders, a rotor operatively connected to said motor pistons, a toothed rim on said last named rotor, means to hydraulically connect said pump to said motor, and gear wheels including bevel wheels interposed between said toothed rims and said driven shaft.

15. A liquid operated transmission mechanism comprising in combination, a pump having a casing, a hollow driving crank shaft therein, cylinders arranged as a spider rotatably mounted on the crank, pistons cooperating with said cylinders, a rotor surrounding said spider and rotatably mounted on said shaft and in the casing, piston rods interposed between said pistons and said rotor, a toothed rim on said rotor, a motor having motor cylinders arranged as a spider, a non-rotating hollow motor shaft on which said latter spider is rotatably mounted, the latter shaft and the hollow driving crank shaft having ports arranged to control the flow of the fluid to and from said cylinders, pistons cooperating with the cylinders of said motor, a rotor on said motor, piston rods interposed between said motor pistons and said motor rotor, a toothed rim on the motor rotor, means to cause a parallel displacement of said non-rotatable shaft for altering the effective stroke of the motor pistons and thereby the transmission ratio, means for hydraulically interconnecting said hollow shafts and their ports, a driven shaft and a positive connection between said toothed rims and the driven shaft.

16. A liquid operated transmission mechanism comprising in combination, a pump comprising a rotor, a hollow driving crank shaft therefor, cylinders arranged as a spider rotatably mounted on the crank of the driving shaft, pistons cooperating with said cylinders, piston rods interposed between said pistons and said rotor surrounding the cylinder spider, said driving crank shaft being rotatably mounted in said rotor, a casing for the rotor, a toothed rim on said rotor, a motor comprising a non-rotating hollow shaft, cylinders arranged as a spider rotatably mounted on said non-rotating hollow shaft, the latter and the hollow driving shaft having ports arranged to control the flow of fluid to and from their respective cylinders, pistons cooperating with the cylinders of said motor, a motor rotor driven by the motor pistons, toothed rims on said motor rotor, piston rods interposed betwen said pistons and the rotor of the motor, means on the motor for altering the effective stroke of the motor pistons, means for hydraulically interconnecting said ports, a driven shaft, a positive connection between said toothed rims and the driven shaft, means to compensate the bearing pressure between said cylinder spiders and the parts around which they rotate, and means inserted in said hydraulically connecting means to relieve and to cut out said motor and to by-pass the motor and thereby discharge liquid from the discharge side to the inlet side of the pump.

17. A liquid operated transmission mechanism, comprising in combination, a pump of the rotating cylinder type, a motor of the rotating cylinder type, the cylinders of the pump and motor being arranged to form spiders, members cooperating with said cylinders to form with the latter working chambers for the fluid, rotors in pump and motor, said members being operatively connected to said rotors, hollow shafts around which said spiders rotate and provided with ports arranged to control the flow of the fluid to and from said cylinders, each hollow shaft having a centre wall forming two separate chambers extending therefrom toward the ends so that liquid enters pump and motor at one end of their respective hollow shafts and is discharged at the other end, said centre wall separating the suction and the pressure chamber, a rib of reniform section strengthening the shaft and giving uniform fluid flow channels, means for hydraulically interconnecting said hollow shafts, and means for altering the effective stroke of the members of at least one of the cylinder spiders.

18. A liquid operated transmission mechanism, comprising in combination, a pump of the rotating cylinder type, a motor of the rotating cylinder type, the cylinders of pump and motor being arranged to form spiders, members adapted to reciprocate in said cylinders and forming with the latter working chambers for the fluid, rotors in pump and motor, said members being operatively connected to said rotors, hollow shafts around which said spiders rotate and provided with ports controlled by said spiders, one of said shafts being a crank shaft, the interior of each hollow shaft having two separate chambers extending from the middle portion of the shaft toward the ends so that liquid enters pump and motor at one end of the hollow shaft and is discharged at the other end of said shaft, means for hydraulically interconnecting said hollow shafts and means for altering the effective stroke of the members of at least one of the cylinder spiders.

19. A liquid operated transmission mechanism comprising in combination, a pump of the rotating cylinder type having a rotor, a motor of the rotating cylinder type having a rotor, the cylinders of pump and rotor being arranged to form spiders, pistons cooperating with said cylinders, piston rods interposed between said pistons and said rotors, hollow shafts around which said spiders rotate and provided with ports arranged to control the flow of the fluid to and from said cylinders, one of said shafts being a crank shaft, each hollow shaft having two separate chambers extending from the middle portion of the shaft toward the ends for liquid enter said pump and motor at one end of its hollow shaft and discharge at the other end, a casing enclosing said pump and a casing enclosing said motor, means for mounting said hollow shafts at both ends in the casings, means for hydraulically interconnecting said hollow shafts, and means for altering the effective stroke of the pistons of at least one of the cylinder spiders.

20. A liquid operated transmission mechanism comprising in combination, a pump of the rotating cylinder type having a rotor, a motor of the rotating cylinder type having a rotor, toothed rims on the rotors of the pump and of the motor by means of which the power is transmitted to and from said rotors, the cylinders of pump and motor being arranged to form spiders, pistons cooperating with said cylinders, piston rods interposed between said pistons and said rotors, hollow shafts around which said spiders rotate and provided with ports arranged to control the flow of the liquid to and from said cylinders, each hollow shaft having two separate chambers extending from the middle portion of the shaft toward the ends so that liquid enters pump and motor at one end of the hollow shaft and is discharged at the other end of the hollow shaft, means for hydraulically interconnecting the hollow shafts, and means for altering the effective stroke of the pistons of at least one of the cylinder spiders.

21. A liquid operated transmission mechanism comprising in combination, a pump of the rotating cylinder type having a rotor, a motor of the rotating cylinder type having a rotor, toothed rims on the rotors of the pump and of the motor by means of which power is transmitted to and from said pump and motor, the cylinders of the pump and motor being arranged to form spiders, pistons cooperating with said cylinders, piston rods interposed between said pistons and said rotors, hollow shafts around which said spiders rotate and provided with ports arranged to control the flow of the fluid to and from said cylinders, one of said shafts being a crank shaft and the other being a non-rotatable shaft, the interior of each hollow shaft having two separate chambers extending from the middle portion of the shaft towards the end, so that liquid enters pump and motor at one end of its hollow shaft and is discharged at the other end of said shaft, a casing enclosing said pump and a casing enclosing said motor, means for mounting said hollow shafts at both ends in said casings, means for hydraulically interconnecting said hollow shafts, and means for altering the effective stroke of the pistons of at least one of the cylinder spiders.

In testimony whereof I affix my signature.
HEINRICH SCHNEIDER.